Patented Aug. 16, 1938

2,127,236

UNITED STATES PATENT OFFICE 2,127,236

DYEING ARTIFICIAL SHAPED ARTICLES

Paul Schlack, Berlin-Treptow, Germany, assignor to I. G. Farbenindustrie Aktiengesellschaft, Frankfort-on-the-Main, Germany, a corporation of Germany No Drawing. Application January 9, 1936, Serial No. 58,259. In Germany January 11, 1935

4 Claims. (Cl. 8—5)

This invention relates to dyeing artificial shaped articles.

One of its objects is an improvement in dyeing shaped articles. Another object are the dyed artificial articles resulting from this improvement. Further objects will be seen from the detailed specification following hereafter.

In my co-pending application Ser. No. 57,524 filed Jan. 1, 1936, I have proposed to make artificial shaped bodies such as fibers, ribbons, sheets or films which, owing to the presence of acid groups united with radicals of high molecular weight, which are either present in the parent material or have been introduced by a subsequent treatment, have an enhanced affinity for dyestuffs and other treating agents, in particular for such as are of a basic nature. Such bodies can be dyed or printed generally with production of tints which are deep and usually satisfactorily fast to washing and top-dyeing by means of the known water-soluble basic dyestuffs, for instance those of the di- or triarylmethane, xanthene, acridine, azine, oxazine or thiazine series. However, apart from a few exceptions, the fastness to light of such dyeings is only moderate. An improvement of this fastness by subsequent formation of complex salts is possible only in a few cases.

The present invention relates to the dyeing or coloring of such bodies with acid groups linked, for instance, to a cellulose radical or the radical of an artificial resin, with water-soluble dyestuffs which contain one or more strongly basic groups, not essential in themselves for the production of the color, and therefore not effective in practice as an auxochrome or chromophor. Dyestuffs of this kind have hitherto not found any practical application in the dyeing of textile materials made of organophilic bodies such as cellulose acetate. They are practically not employed for dyeing acetate artificial silk or other bodies produced from organic cellulose derivatives, such as films or sheets. The available commercial products have no or only very feeble affinity for cellulose derivatives and other organophilic highly polymeric bodies.

These dyestuffs having strongly basic groups are eagerly absorbed by textile material containing acid groups and in general the dyeings therewith are as a rule of good fastness. Dyestuffs having a particularly high molecular weight and inclining to a colloidal character are less to be recommended because the fastness to rubbing of the dyeings is not very good. There is in principle no difficulty in making dyestuffs of the type set forth having good affinity for the textiles in question and, indeed, they may be produced in any desired color tint. Nor is one confined to any particular class of dyestuffs. It is possible, therefore, with due regard to requirements as to fastness, mordanting, discharging, fastness to acids or the like conditions, to draw upon numerous types, for instance dyestuffs of the azo class, di- and triphenylmethane, xanthene, acridine, azine, oxazine, triazine, aminonaphthalimide or indigoid dyestuffs, anthraquinone derivatives, particularly amino- and aminohydroxyanthra-quinone, anthraquinonylmercaptanes and -sulfides, anthraquinolines, anthrapyrimidines. Furthermore, dyestuffs containing metal in complex union are available. They may either contain the metal in the dyestuff molecule or the complex union may be produced during the dyeing or after the dyeing. Also the fiber may be preliminarily treated with a solution containing the cations which enter into complex union. In this manner strong dyeings may be produced with the products of German specification No. 494,531 or No. 582,689.

Analogously to the usual methods now dyestuffs or dyestuff derivatives useful for the invention may be built up from components which contain one or more strongly basic groups or comprise radicals which are easily converted into such groups, for instance by reduction, hydrolysis or amination. However, basic radicals may also be introduced subsequently into already available dyestuffs or colored substances.

Groups which are strongly basic and which tend to make the compounds to which they are linked soluble in water can be united directly to an aryl nucleus, for example in the form of a quaternary group, as in the case of azo-dyestuffs with quaternary components, for instance azo-dyestuffs from diazotized meta-amino-phenyltrimethylammonium-chloride or from diazotized para-aminophenyl-pyridinium-chloride (Vorländer, Berichte 58, 1925, page 1905.

Other dyestuffs with quaternary groups attached to an aryl nucleus are the products of the reaction of dyestuffs or substances which are adapted for dyestuff formation and which contain in their molecule a halogen atom linked to the aryl nucleus, said halogen atom being capable of being exchanged with tertiary amines, such as pyridine. As examples there may be mentioned the products of the reaction of 1-amino-4-halogenanthraquinones with pyridine as well as the analogous products produced by the action of metal halides in the presence of pyridine or pyridine derivatives on 1-aminoanthraquinone and its derivatives (compare German specifications Nos. 593,671 and 593,672).

More important and of more general application, however, are those dyestuff derivatives and dyestuff intermediates in which the strongly basic groups are connected indirectly with a chromophor, chromogen or auxochrome by any desired kind of radical.

Characteristic dyestuffs containing the groups which can be introduced into any dyestuff types are represented by the following formulae:

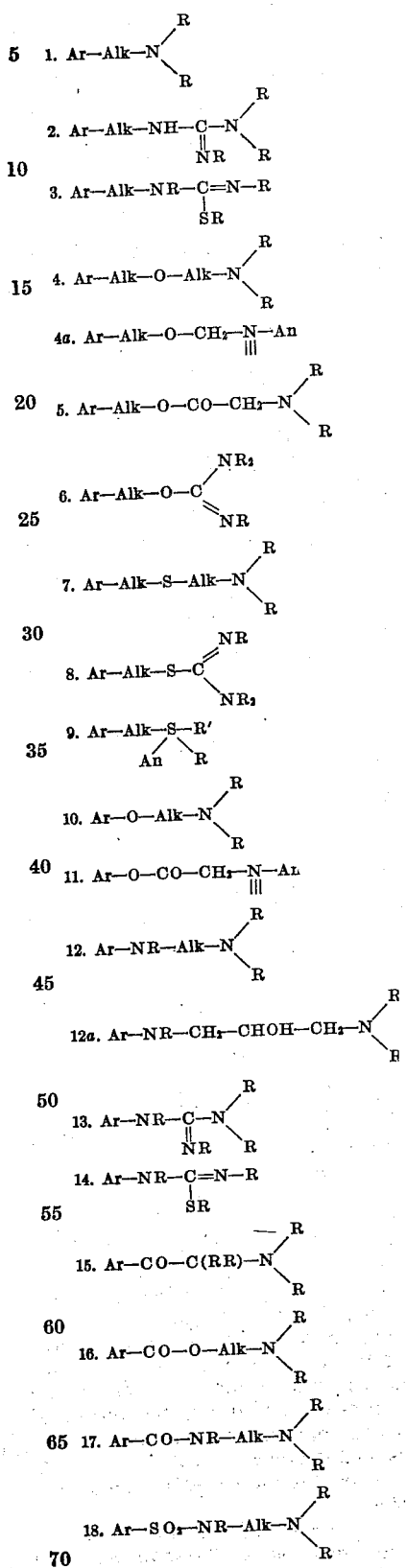

In these formulae Ar stands for an aryl dye nucleus or another chromogen radical, R stands for hydrogen or alkyl or a substituted alkyl, R' stands for alkyl or substituted alkyl, Alk stands for alkylene, An stands for a monovalent anion and

stands for pentavalent basic nitrogen.

Provided they have satisfactory fastness to light those dyestuffs are particularly valuable which, besides one or more strong basic groups have more than one radical which increases the affinity to cellulose esters or ethers or to other organophilic highly polymeric bodies. In this case it is not of importance whether these radicals influence the optimum effect of the dyeing. For example the following formulae represent such groups attached to an aryl dye nucleus or other chromogen (Ar):

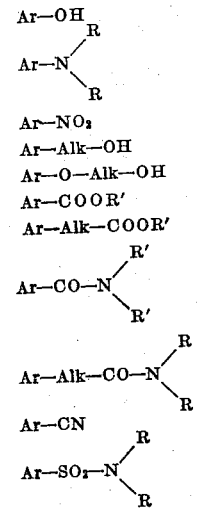

The production of dyestuffs suitable for the process of the invention may be on known lines, for example the following methods are available:

1. Amination of dyestuffs or colored compounds which contain ester radicals capable of exchange, for example the sulfuric acid radical, the toluene-sulfonic acid radical or the radical of a hydrohalogen acid, the amination agent being ammonia, a primary, secondary or tertiary amine, a thiourea or hexamethylenetetramine.

2. Reaction of dyestuffs having acid groups or reactive dyestuff derivatives, for example substances having acid-chloride, acid-ester, acid-amide, acid-azide or acid-anhydride groups, with polyvalent amines, particularly those containing only one nitrogen atom having hydrogen capable of exchange.

3. Action of halogenalkylamines, ethyleneimines, trimethyleneimines and basic alkyleneoxides, for example diethylaminopropene-oxide and quaternary derivatives of such compounds, on colored substances having reactive hydroxyl, sulfhydryl, amino- or imino-groups.

4. Substances of carboxyl-groups or their functional derivatives by amino-groups by a degradation process, such as that of Hofmann, Curtius or K. F. Schmidt.

5. Introduction of basic nitrogen into colored substances having ketonic or aldehydic carbonyl radicals by reduction of oximes, hydrazones or by catalytic hydrogenation in presence of ammonia or a primary or secondary amine.

6. Substitution of nuclear substituents by radicals of polyvalent amine, particularly in the anthraquinone series.

It is not necessary that the basic groups should remain in the finished dyeing. They may be removed by a subsequent treatment or during the dyeing or printing operation. In this case, however, it is preferable to use such dyestuffs as otherwise contain no groups which are non-basic and impart easy solubility in water. By such a removal of the groups in question a change of color tint may be produced or on the other hand the dyeing may only be caused to develop. Examples are dyeings with pyridinium compounds from chlor-acetylated para-hydroxyazo-bodies, for example the pyridinium-compound of chloromethylbenzenesulfoleucothioindigo or like dyestuff derivatives. Other basic radicals capable of being eliminated are obtained by the action of basic substituted isocyanates or of ester chlorides of aminoalcohols, for example chloroformic acid-$\beta$-diethyl-aminoethyl ester.

Furthermore, by eliminating basic groups azo-dyestuffs may be produced by treating the body having an acid group with a salt of an aminoacylated phenol or of another azo-component, for example with acetyl-$\beta$-naphthol-$\omega$-pyridinium chloride, or an analogous product from a hydroxy-naphthoic acid-arylide and subsequently treating the material thus grounded, if desired locally, with a diazonium compound under such conditions that the phenyl-ester radical is saponified, for example in the presence of an organic base (compare German Patent No. 609,475). The diazonium salt and basic component may be applied together and development may follow by varying the pH value or the temperature or by steaming the dyeing.

The bodies are best dyed neutral or feebly acid, for instance in presence of acetic acid or sodium acetate. In order to produce level dyeing it may be of advantage to add dyeing auxiliaries having active cations which are indifferent to the dyestuff, for example dodecylamine-acetate, dodecyl-trimethylammonium chloride, oleylaminoethyl-methyl-diethyl-ammoniummethosulfate or the like. Also swelling agent and other known agents for increasing the affinity of hydrophobic bodies for dyestuffs may be added, for instance sodium tetrahydronaphthalene sulfonate and other hydrotropic materials; the addition may be made to the dye-liquor, padding liquor or printing paste, or the material to be dyed can be pretreated with such agents. For dyeing by the impregnation process, fabrics, for instance acetate artificial silk, having acid groups, are essentially more suitable than those of ordinary acetate artificial silk, particularly if the operation is conducted in the presence of swelling agents. The colored products may be after-treated with agents for fixing basic dyestuffs, for example with hydroxy-carboxylic- or hydroxy-sulfonic acids, tannin and other agents which precipitate basic dyestuffs. In many cases, also, the basic dyeings may be over-dyed with acid dyestuffs, for instance with Quinoline Yellow S or with Alizarine Direct Blue A, so that mixed tones which are thoroughly fast to water and washing are obtainable. The hydrophil character of the dyed product may be diminished or removed by an after-treatment with a metal salt, particularly an aluminium salt, or with an amine, an amine derivative or a quaternary ammonium salt of high molecular weight.

The following examples illustrate the invention:

*Example 1.*—An acetate artificial silk containing 10 per cent of the polymerization product from 1 mol. maleic acid anhydride and 1 mol. vinyl chloride is dyed with 2 per cent of the product obtained by condensing 1:4 - dipara - hydroxy-phenylaminoanthraquinone with $\beta$-chlorethyldiethylamine in a solution feebly acid with acetic acid. There is obtained a strong, dark green dyeing, fast to washing. Under like conditions an ordinary acetate artificial silk made from the same acetylcellulose is only feebly tinted.

For making the dyestuff used in this example 1 mol. of 1:4-di-para-hydroxy-phenyldiaminoanthraquinone is heated in glycol-mono-ethyl-ether together with 2 mols sodium and 2 mols $\beta$-chlorethyldiethylamine hydrochloride at 130° C. until the whole has become soluble in dilute acetic acid. The liquid in which the reaction has occurred may be used directly or, if desired, after distillation of a portion of the glycol-mono-ethyl-ether for preparing the dye-liquor.

*Example 2.*—An acetate artificial silk containing 10 per cent of the polymerization product from 1 mol. maleic acid anhydride and 4 mols vinyl chloracetate is suspended for 8 hours at 80° C. in air containing trimethylamine and of 75 per cent relative humidity. The silk can then be dyed strong violet-blue by means of the dyestuff from 1:4-di-$\alpha$-chlorohydroxy-propylaminoanthraquinone and morpholine in a solution of sodium acetate, feebly acid with acetic acid. In order to make the dyestuff, a mixture of di-$\alpha$-chlorohydroxypropylamino-anthraquinone, 2 mols fused potassium acetate, some copper powder and an excess of morpholine is heated to boiling until the dyestuff is substantially soluble in dilute acetic acid. Before isolating the dyestuff, the excess of morpholine is distilled under diminished pressure. The silk used in this example has also affinity for acid dyestuffs. Correspondingly it can be top-dyed with acid dyestuffs.

*Example 3.*—Acetate artificial silk containing 10 per cent of the polymerization product from 1 molecular proportion of vinylethylether on 1 molecular proportion of maleic acid anhydride, is dyed in a liquor containing sodium acetate, and feebly acid with acetic acid, with Janus Brown B (Schultz, Farbstofftabellen, 5th edition, No. 435).

*Example 4.*—The acetate artificial silk described for use in Example 1 is dyed with 2 per cent of 2-methoxy-6-chloro-9-$\alpha$-diethylamino-$\gamma$-pentyl-amino-acridine in a bath feebly acid with acetic acid. The very strong yellow dyeing may be top-dyed with Alizarine Direct Blue A, whereby a green of very good fastness to washing is produced. Instead of the acid acridine dyestuff its monomethiodide may be used. Ordinary acetate artificial silk is merely tinted by the non-methylated acridine, and is not dyed at all by the methiodide.

*Example 5.*—The acetate artificial silk described in Example 1 is dyed with 2 per cent of the dyestuff described in Example 4b of German specification No. 593,672 in presence of 2 grams per litre of sodium acetate. There is obtained a powerful, bluish-red.

*Example 6.*—The acetate artificial silk described in Example 1 is dyed with 2 per cent of the dyestuff made as described in Example 9 of German specification No. 593,671 from 5-bromo-indol-2:2'-thionaphthene-indigo and pyridine, sodium acetate being present in the bath. There is obtained a powerful blue.

*Example 7.*—The acetate artificial silk described in Example 1 is dyed with 2 per cent of Tannin Orange R in presence of sodium acetate (Schultz, Farbstofftabellen, 5th edition, No. 74).

*Example 8.*—The acetate artificial silk described in Example 1 is dyed in presence of acetic acid and sodium acetate with 2 per cent of the dyestuff from 1-amino-4-chloranthraquinone and γ-dimethylamino-n-propylamine. For obtaining the dyestuff 1-amino-4-chloranthraquinone is heated in presence of fused potassium acetate and some copper acetate with excess of the amine, while gently boiling (for about half-an-hour) until the dyestuff has become soluble in dilute acetic acid. There is obtained a blue-violet dyeing.

What I claim is:

1. In a process of dyeing artificial fibers or foils from cellulose esters containing polymerized acid resins, the improvement which comprises dyeing the material in a bath in which is dissolved a dyestuff containing a strongly basic group which is not essential for the production of the color.

2. In a process of dyeing artificial fibers or foils from water-insoluble organic cellulose derivatives containing polymeric acid resins, the improvement which comprises treating the materials in a bath containing an agent selected from the group consisting of dyes and leuco-derivatives of dyes, said agents containing in their molecule a strongly basic group which is not essential for the production of the color.

3. In a process of dyeing artificial fibers or foils from cellulose esters containing polymeric acid resins, the improvement which comprises dyeing the material in a bath in which is dissolved a dyestuff containing a strongly basic group which is not essential for the production of the color and contains pentavalent basic nitrogen.

4. In a process of dyeing cellulose acetate artificial silk containing a mixed polymerizate from maleic acid anhydride and a vinylalkylether, the improvement which comprises dyeing said acetate artificial silk in a feebly acid bath in which is dissolved a dyestuff containing a strongly basic group which is not essential for the production of the color.

PAUL SCHLACK.